(12) United States Patent
Hamano et al.

(10) Patent No.: US 6,577,450 B2
(45) Date of Patent: Jun. 10, 2003

(54) ZOOM LENS AND OPTICAL APPARATUS USING THE SAME

(75) Inventors: Hiroyuki Hamano, Ibaraki (JP); Hiroshi Saruwatari, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 09/961,302

(22) Filed: Sep. 25, 2001

(65) Prior Publication Data

US 2002/0063969 A1 May 30, 2002

(30) Foreign Application Priority Data

Sep. 29, 2000 (JP) ........................................ 2000-299496

(51) Int. Cl.⁷ ............................................... G02B 15/14
(52) U.S. Cl. ........................................ 359/687; 359/686
(58) Field of Search ................................ 359/687, 686, 359/742

(56) References Cited

U.S. PATENT DOCUMENTS

| | | | |
|---|---|---|---|
| 5,044,706 A | 9/1991 | Chen | |
| 5,268,790 A | 12/1993 | Chen | |
| 5,677,792 A | 10/1997 | Hamano | ............ 359/557 |
| 5,790,321 A | 8/1998 | Goto | |
| 5,872,658 A | 2/1999 | Ori | |
| 6,016,228 A | 1/2000 | Uzawa | |
| 6,069,743 A | 5/2000 | Nagata et al. | |
| 6,097,547 A * | 8/2000 | Ogata et al. | ............ 359/673 |
| 6,384,985 B1 * | 5/2002 | Hashimura | ............ 359/686 |

FOREIGN PATENT DOCUMENTS

| | | |
|---|---|---|
| JP | 62-24213 | 2/1987 |
| JP | 62-247316 | 10/1987 |
| JP | 4-213421 | 8/1992 |
| JP | 6-324262 | 11/1994 |
| JP | 9-211329 | 8/1997 |
| JP | 10-62687 | 3/1998 |
| JP | 10-133149 | 5/1998 |
| JP | 11-271616 | 10/1999 |

* cited by examiner

Primary Examiner—Scott J. Sugarman
Assistant Examiner—Deborah Raizen
(74) Attorney, Agent, or Firm—Fitzpatrick, Cella, Harper & Scinto

(57) ABSTRACT

A zoom lens which has good optical performance with the number of lenses reduced as a result of forming a diffraction optical surface is disclosed. The zoom lens includes, in order from object side to image side, a first lens unit consisting of a positive lens element and having a positive optical power, a second lens unit having a negative optical power, a third lens unit having a positive optical power, and a fourth lens unit having a positive optical power. When zooming is performed from a wide angle end to a telephoto end, the first lens unit and the third lens unit are moved so that, at the telephoto end, they are closer to the object side, and the second lens unit is moved so that, at the telephoto end, it is closer to the image side. The zoom lens further includes at least one diffraction optical surface.

15 Claims, 17 Drawing Sheets

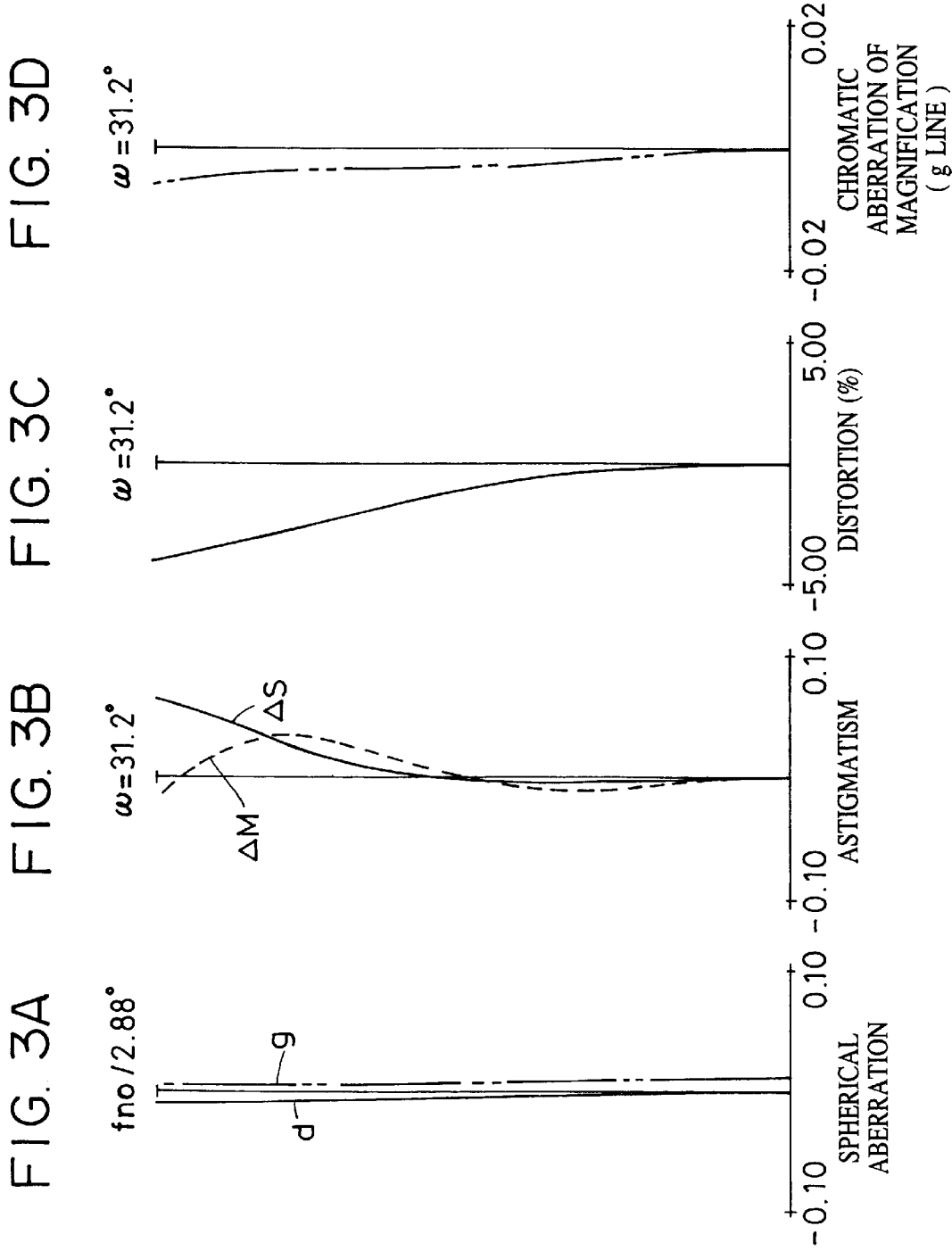

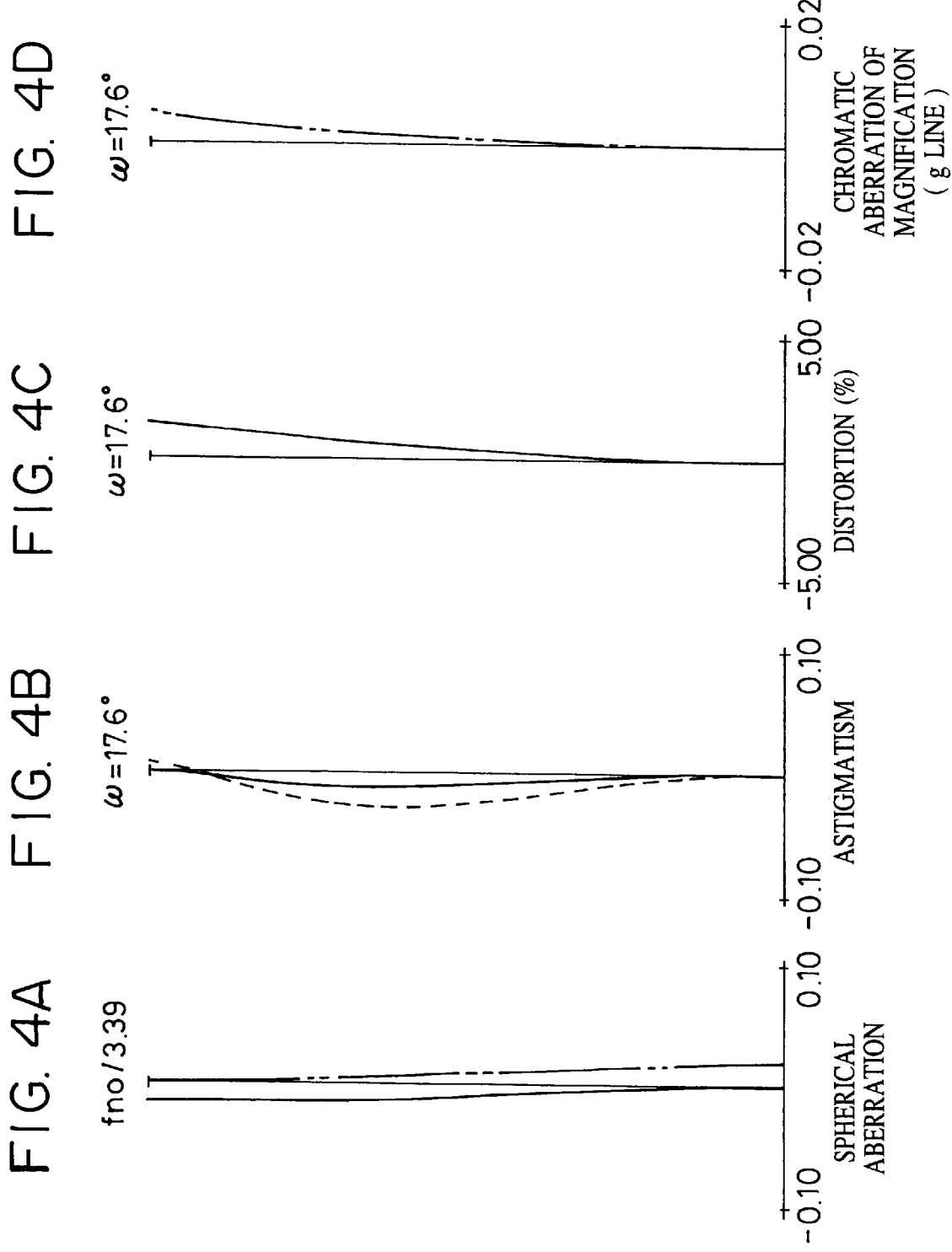

ZOOM LENS AND OPTICAL APPARATUS USING THE SAME

BACKGROUND OF THE INVENTION

1. Field of the Invention

The present invention relates to a zoom lens and an optical apparatus using the zoom lens, and, more particularly, to a zoom lens that is suitable for use in an optical apparatus, such as a photographic camera, a video camera, a digital camera, or a broadcasting camera, in which aberrations, particularly chromatic aberration, have been properly corrected by using a diffraction optical surface in a portion of a lens system.

2. Description of the Related Art

In recent years, smaller and lighter optical apparatuses, such as home videos and digital cameras, have caused a demand for an image pickup zoom lens device, used in such optical apparatuses, that has a small overall length and whose front lens unit has a small diameter.

What is called a rear focus zoom lens device that performs focusing as a result of moving a lens unit other than a first lens unit disposed at an object side is known as one means for achieving this object.

In general, the first lens unit of the rear focus zoom lens device has a smaller effective diameter than the first lens unit of a zoom lens device that performs focusing as a result of moving the first lens unit. Therefore, it becomes easier to reduce the size of the entire lens system, and to perform a shooting operation at a close distance, particularly at a very close distance. In addition, since a small, light lens unit is moved, only a small driving force needs to be exerted on the lens unit, so that, for example, proper focus can be quickly obtained.

Such a rear focus zoom lens device is disclosed in, for example, Japanese Laid-Open Nos. 62-24213 and 62-247316. The rear focus zoom lens devices disclosed in these documents comprise four lens units, which are, in order of lens units from the lens unit closest to the object side, a first lens unit having a positive refractive power, a second lens unit having a negative refractive power, a third lens unit having a positive refractive power, and a fourth lens unit having a positive refractive power. The second lens unit is moved to change magnification, and the fourth lens unit is moved to perform focusing and to change an image plane with changes in magnification.

In general, in order to effectively increase mountability to a camera when the camera is not used, the lenses are collapsibly mounted therein. However, in the zoom lens device of the above-described type whose second lens unit takes over most of the magnification change function for changing magnification, sensitivities of the first and second lens units with respect to decentering are too large, so that this type of zoom lens device is not suited to be collapsibly mounted to the camera.

To overcome this problem, a zoom lens device having a magnification change ratio of the order of 3 has been proposed in Japanese Patent Laid-Open No. 10-62687 (U.S. Pat. No. 6,016,228). This zoom lens device comprises four lens units, which are, in order of lens units from the lens unit closest to the object side, a first lens unit having a positive refractive power, a second lens unit having a negative refractive power, a third lens unit having a positive refractive power, and a fourth lens unit having a positive refractive power. The first lens unit consists of a single lens, and the second, third, and fourth lens units are moved to perform magnification changes. The fourth lens unit is moved to perform focusing. Therefore, the optical system is simplified, thereby allowing it to have a structure that is suitable for collapsible mounting.

On the other hand, in recent years, a method that uses a diffraction optical element (diffraction optical surface) has been proposed as a method of restricting the occurrence of chromatic aberration.

For example, in Japanese Patent Laid-Open Nos. 4-213421 (U.S. Pat. No. 5,044,706) and 6-324262 (U.S. Pat. No. 5,790,321), chromatic aberration is reduced by using a diffraction optical element for the single lens. In U.S. Pat. No. 5,268,790, the use of a diffraction optical element in the second lens unit or the third lens unit of the zoom lens device is proposed in order to reduce the number of lenses used and the size of the zoom lens device compared to conventional zoom lens devices. However, the reduction in the number of lenses and the reduction in the size of the zoom lens device have not been satisfactorily achieved.

The zoom lens devices disclosed in Japanese Patent Laid-Open Nos. 9-211329 (U.S. Pat. No. 5,872,658) and 11-271616 (U.S. Pat. No. 6,069,743) each comprise four lens units, which are, in order of lens units from the lens unit closest to the object side, a first lens unit having a positive refractive power, a second lens unit having a negative refractive power, a third lens unit having a positive refractive power, and a fourth lens unit having a positive refractive power. The first lens unit consists of a single lens, and a diffraction optical surface is used in the first lens unit in order to reduce the number of lenses used and to reduce the size of the zoom lens device.

When, in order to reduce the size of the optical system, an attempt is made to reduce the number of lenses used by merely increasing the refractive power of the lens units, the thicknesses of the lenses increase. Therefore, the size of the optical system is not satisfactorily effectively reduced and, at the same time, it becomes difficult to correct various aberrations.

When an attempt is made to collapsibly mount the lenses when they are not used, mechanical structural errors, such as lens tilting, inevitably become large, so that, when lens sensitivity (that is, the ratio of the amount of displacement of an image plane to the amount of displacement per lens) becomes large, optical performance deteriorates and image jitters occur when magnifications change. Therefore, it is desirable that the sensitivities of lens units be kept as small as possible.

In zoom lenses comprising four lens units, which are a lens unit having a positive refractive power, a lens unit having a negative refractive power, a lens unit having a positive refractive power, and a lens unit having a positive refractive power, when an attempt is made to perform magnification changes by moving only the second lens unit and the fourth lens unit, most of the task of changing magnification must be performed by the second lens unit, so that the refractive powers of the first and second lens units inevitably need to be made large.

In contrast, the zoom optical system disclosed in Japanese Patent Laid-Open No. 10-62687 is suited to be formed into a collapsible mount structure because the sensitivities of the first and second lens units become relatively small. However, since the first lens unit is fixed when magnification is being changed, it is difficult to obtain a high magnification change ratio equal to or greater than 5.

In zoom lens devices having a high zoom ratio equal to or greater than 5, it is difficult to properly correct changes in chromatic aberration that occur with changes in magnification unless chromatic aberration that occurs in each of the lens units is corrected to a certain extent. Although the number of lenses used can be reduced using aspherical surfaces in the optical system, when an attempt is made to reduce the number of lenses used by merely using aspherical surfaces, the refractive powers of the positive lenses become too large, so that the lenses need to be formed with shapes that are difficult to manufacture. Therefore, the refractive power at a magnification change portion needs to be weakened, thereby making it difficult to reduce the overall length of the zoom lens device.

In order to overcome these problems, various zoom lens devices that include diffraction optical surfaces have been proposed. However, in order to obtain a high-performance optical system that is adaptable to, for example, digital still cameras having two million or more pixels by using a magnification change ratio of the order of 5 and a simple structure, it is necessary to properly set the lens structure.

SUMMARY OF THE INVENTION

It is an object of the present invention to provide a zoom lens which comprises a diffraction optical surface in a portion of an optical system in order to reduce chromatic aberration that occurs in each lens unit by combining diffractive optical action and achromatization effect of a diffractive system, which has reduced overall length as a result of reducing the number of lenses used while the refractive power at a magnification change portion is maintained, and which provides good optical performance over the entire magnification change range from a wide angle end and to a telephoto end. It is also an object of the present invention to provide an optical apparatus using the zoom lens.

To these ends, according to the present invention, there is provided a zoom lens that includes, in order from an object side to an image side, a first lens unit consisting of a positive lens element and having a positive optical power (equal to the reciprocal of the focal length), a second lens unit having a negative optical power, a third lens unit having a positive optical power, and a fourth lens unit having a positive optical power. In the zoom lens, when zooming is performed from a wide angle end to a telephoto end, the first lens unit and the third lens unit are moved so that, at the telephoto end, they are positioned closer to the object side than to the wide angle end, and the second lens unit is moved so that, at the telephoto end, it is positioned closer to the image side than to the wide angle end. The zoom lens also includes at least one diffraction optical surface.

Further objects, features and advantages of the present invention will become apparent from the following description of the preferred embodiments with reference to the attached drawings.

BRIEF DESCRIPTION OF THE DRAWINGS

FIGS. 3A to 3D show aberrations at a wide angle end of the zoom lens of the first numerical example in accordance with the present invention.

FIGS. 4A to 4D show the aberrations at an intermediate location of the zoom lens of the first numerical example in accordance with the present invention.

DESCRIPTION OF THE PREFERRED EMBODIMENTS

Figure 1:
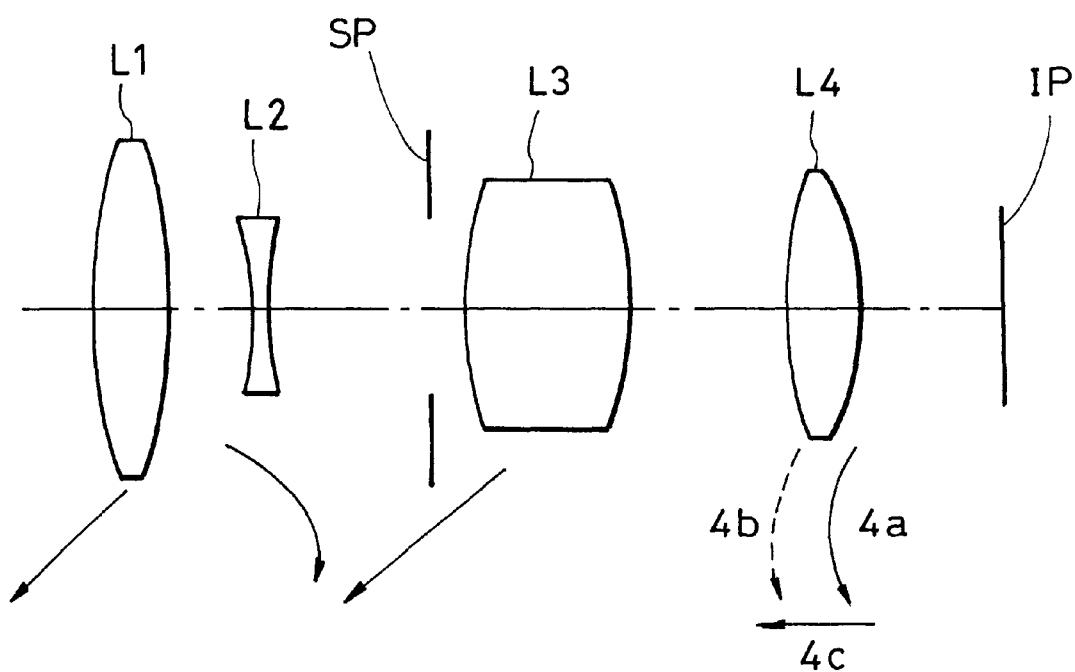
FIG. 1 illustrates a paraxial refractive power arrangement in an embodiment of a zoom lens in accordance with the present invention.

A description of embodiments of the present invention will now be given with reference to the drawings. FIG. 1 illustrates a paraxial refractive power arrangement of an embodiment of a zoom lens in accordance with the present invention.

Figure 2:
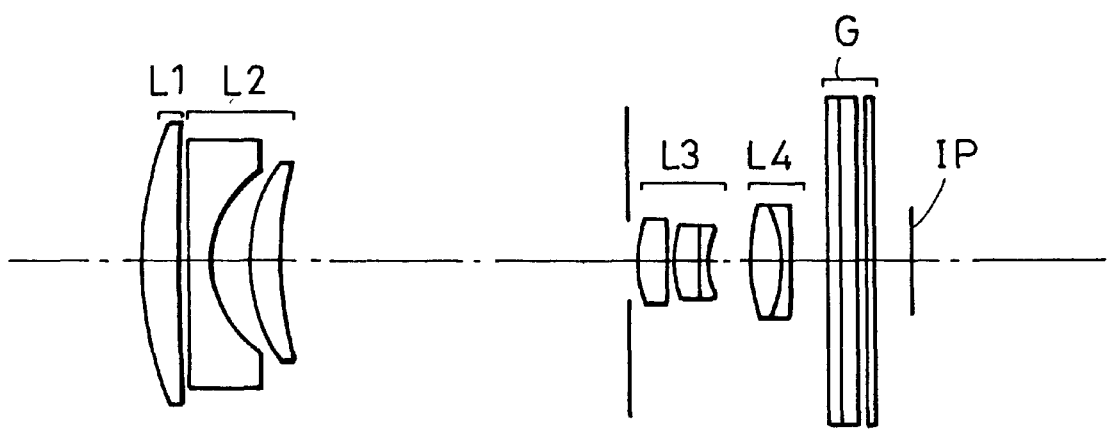
FIG. 2 is a sectional view of the lenses at a wide angle end of a zoom lens of a first numerical example in accordance with the present invention.
Figures 5A, 5B, 5C, 5D:
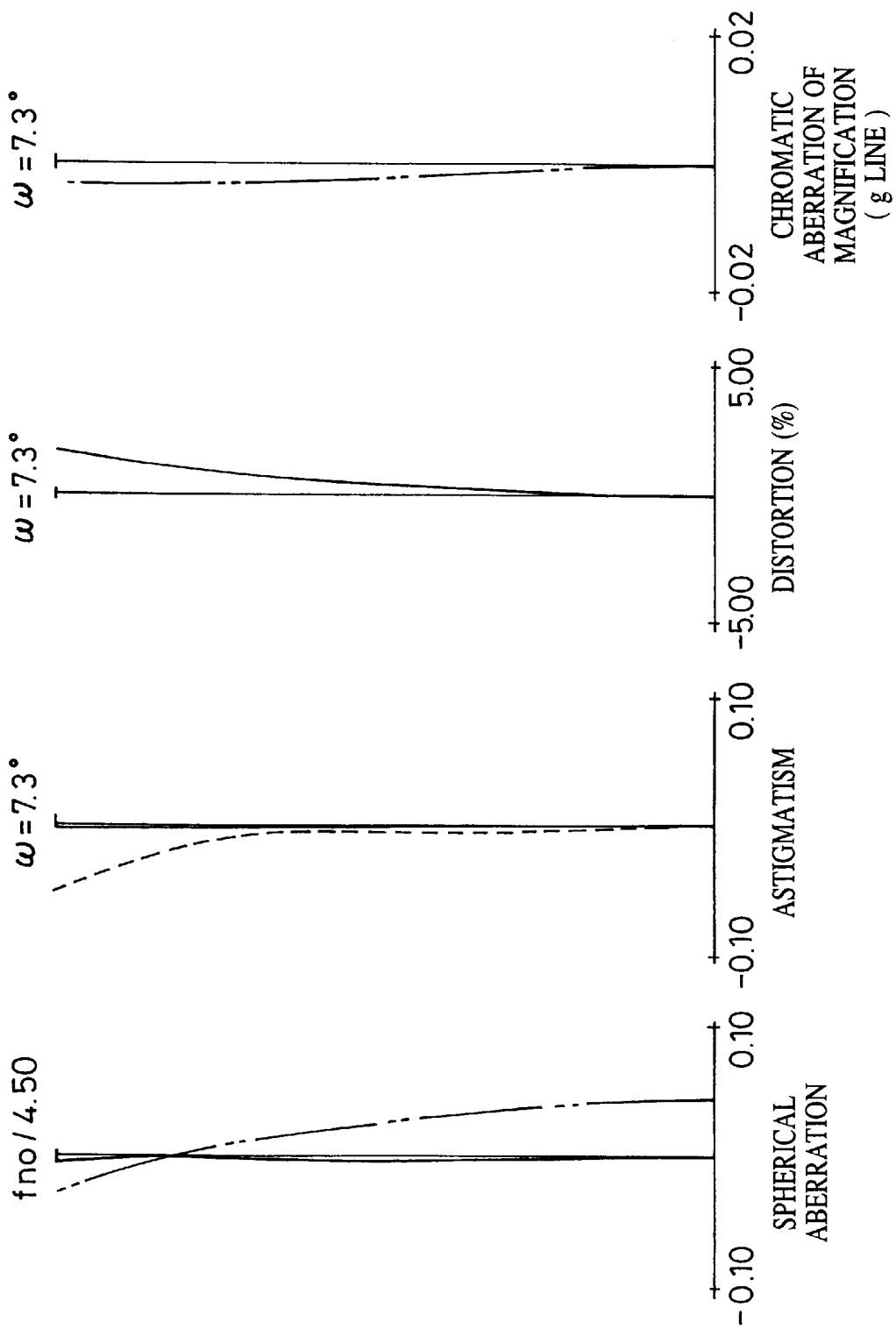
FIGS. 5A to 5D show the aberrations at a telephoto end of the zoom lens of the first numerical example in accordance with the present invention.

FIG. 2 is a sectional view of the lenses at a wide angle end of a zoom lens of a first numerical example (described later) of the embodiment of the present invention. FIGS. 3A to 3D, FIGS. 4A to 4D, and FIGS. 5A to 5D show aberrations at the wide angle end, at an intermediate location, and at a telephoto end, respectively, of the zoom lens of the first numerical example.

Figure 6:
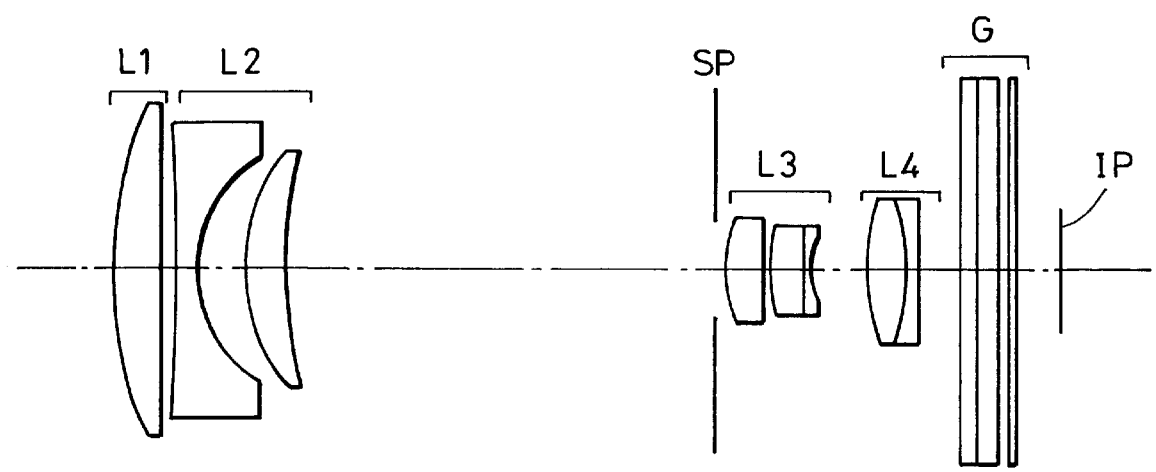
FIG. 6 is a sectional view of the lenses at a wide angle end of a zoom lens of a second numerical example in accordance with the present invention.
Figure 7:
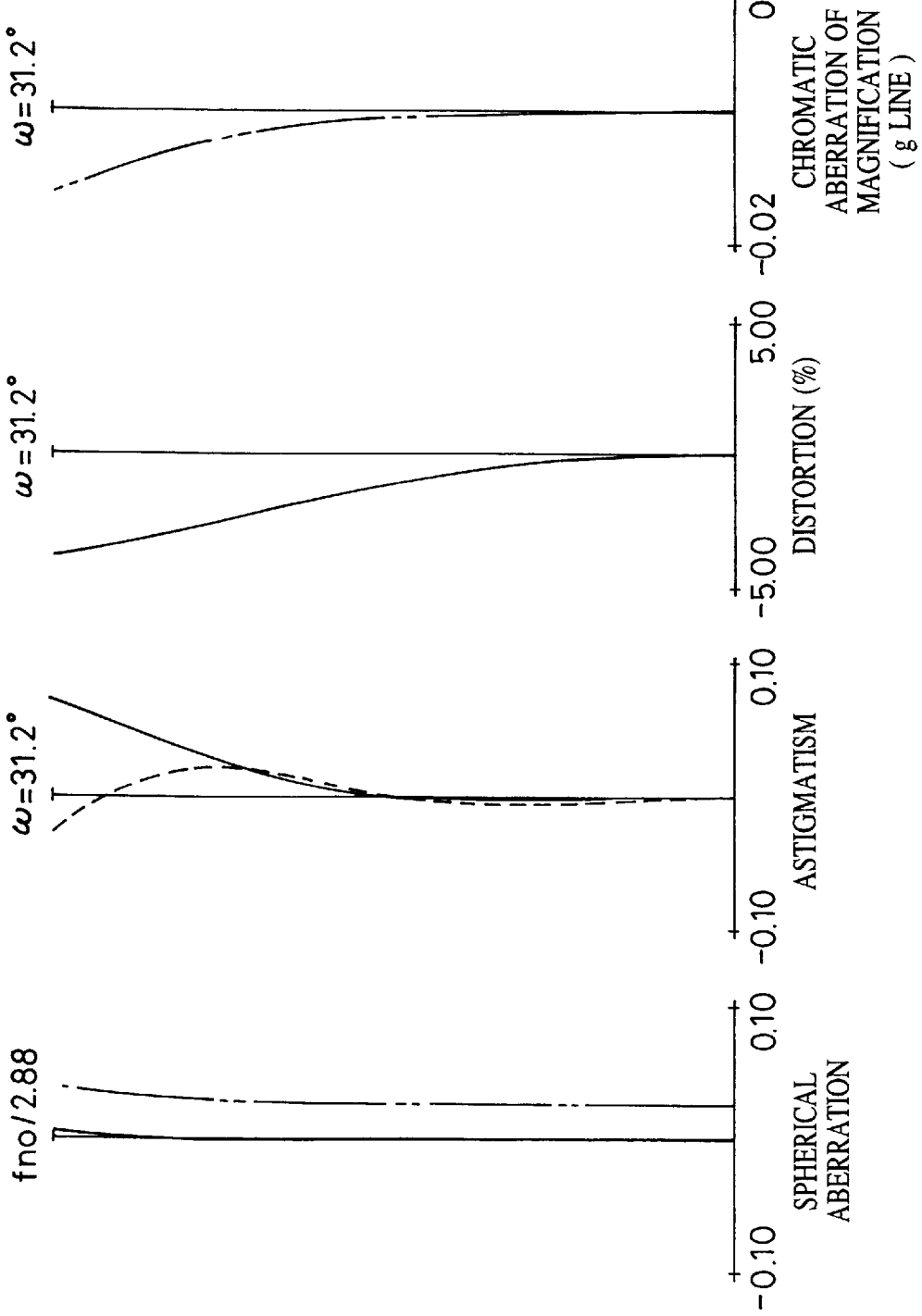
FIGS. 7A to 7D show aberrations at the wide angle end of the zoom lens in the second numerical example in accordance with the present invention.
Figure 8:
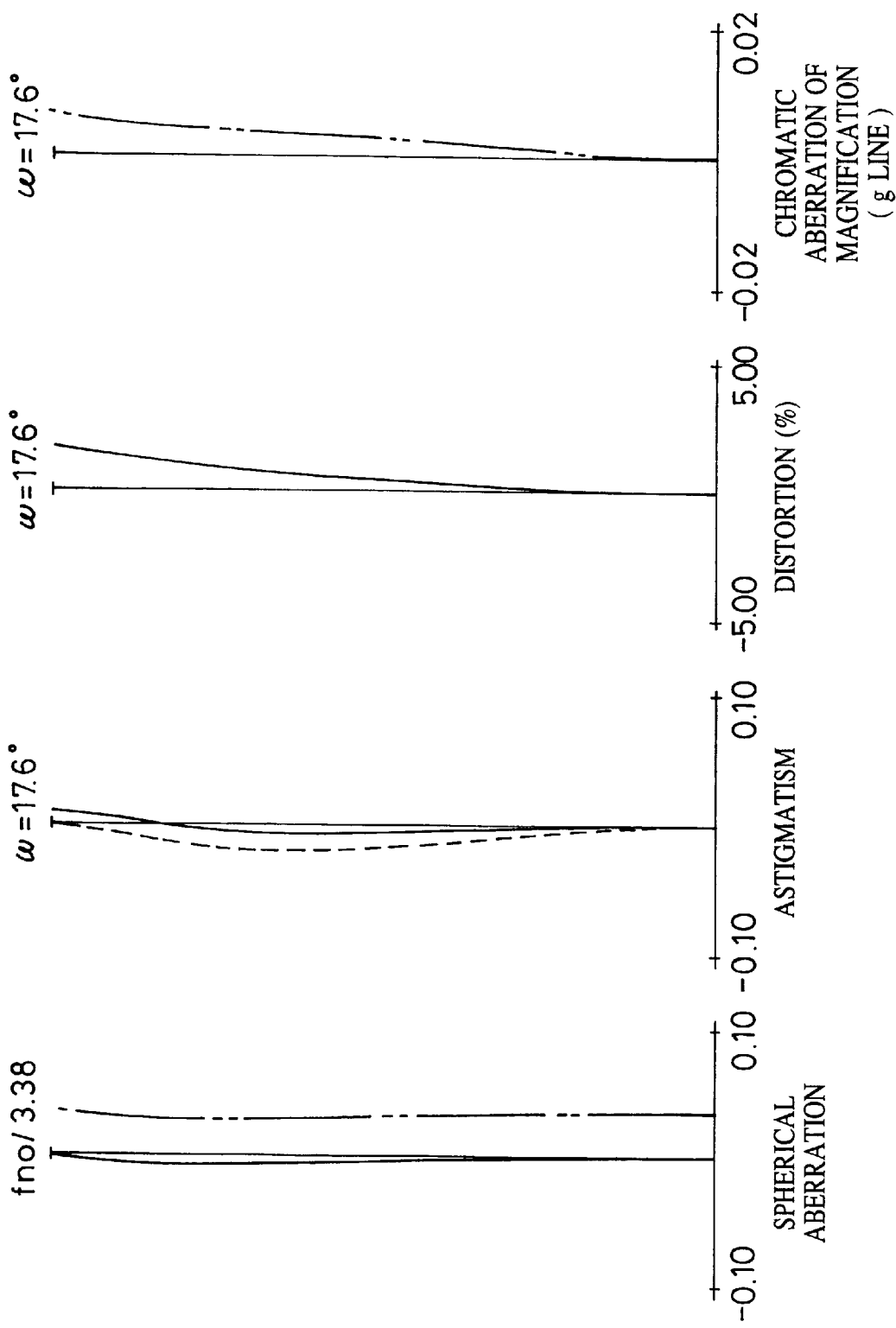
FIGS. 8A to 8D show the aberrations at an intermediate location of the zoom lens of the second numerical example in accordance with the present invention.
Figure 9:
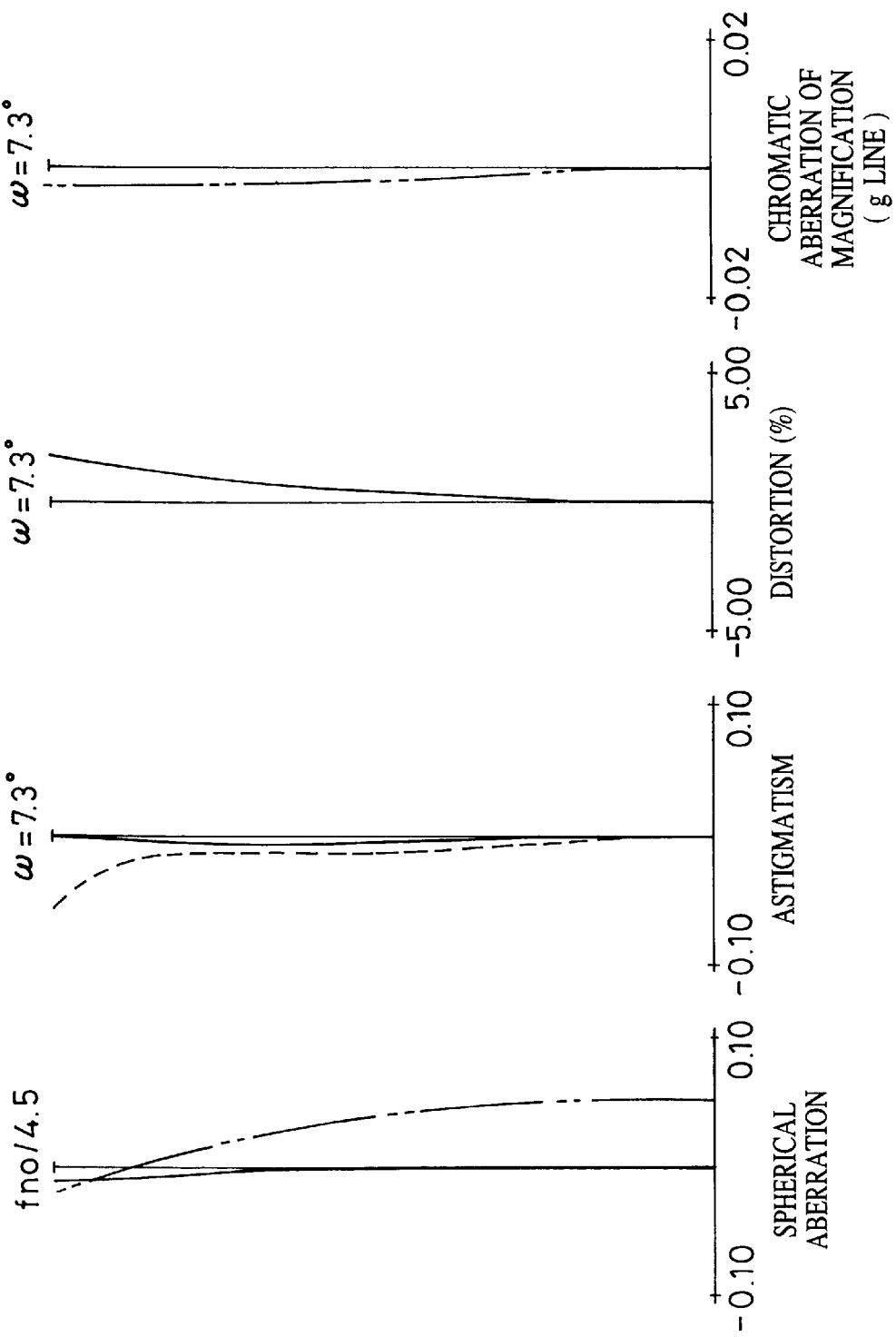
FIGS. 9A to 9D show the aberrations at a telephoto end of the zoom lens of the second numerical example in accordance with the present invention.

FIG. 6 is a sectional view of lenses at a wide angle end of a zoom lens of a second numerical example (described later) of the embodiment of the present invention. FIGS. 7A to 7D, FIGS. 8A to 8D, and FIGS. 9A to 9D show aberrations at the wide angle end, at an intermediate location, and at a telephoto end, respectively, of the zoom lens of the second numerical example.

Figure 10:
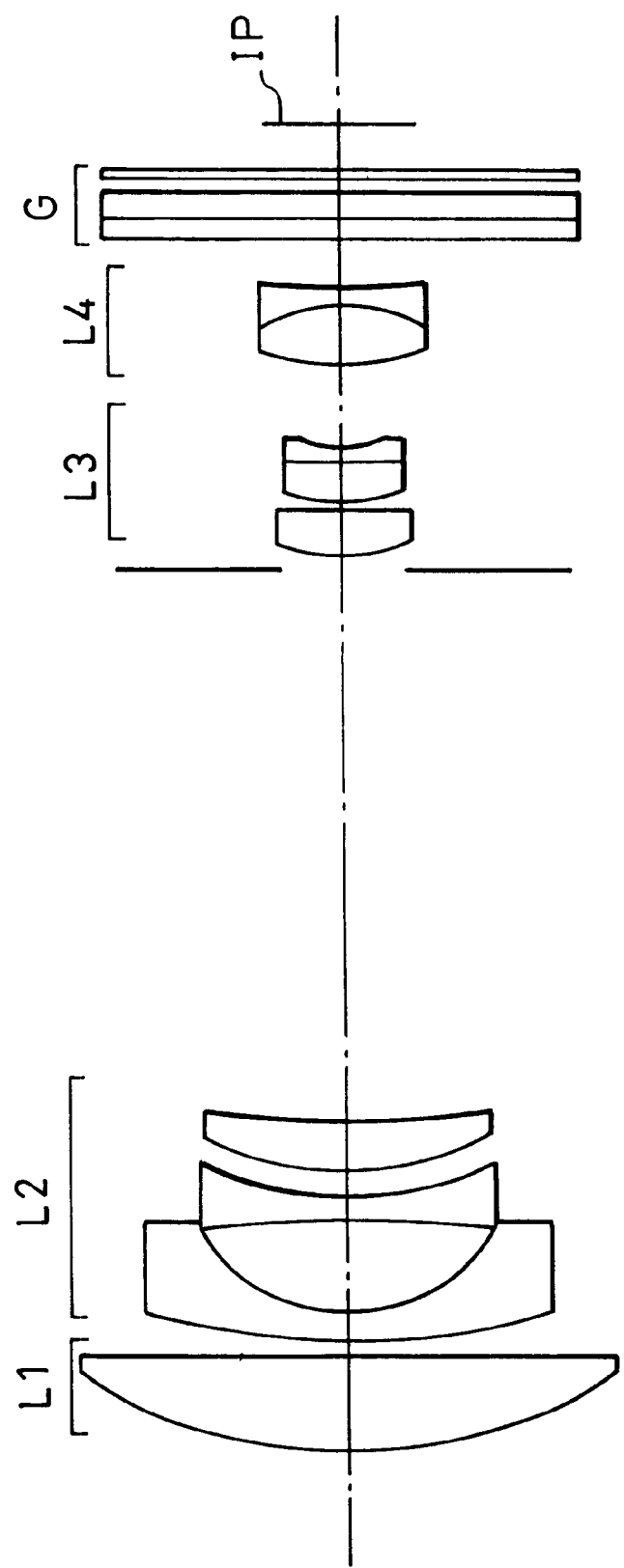
FIG. 10 is a sectional view of the lenses at a wide angle end of a zoom lens of a third numerical example in accordance with the present invention.
Figure 11:
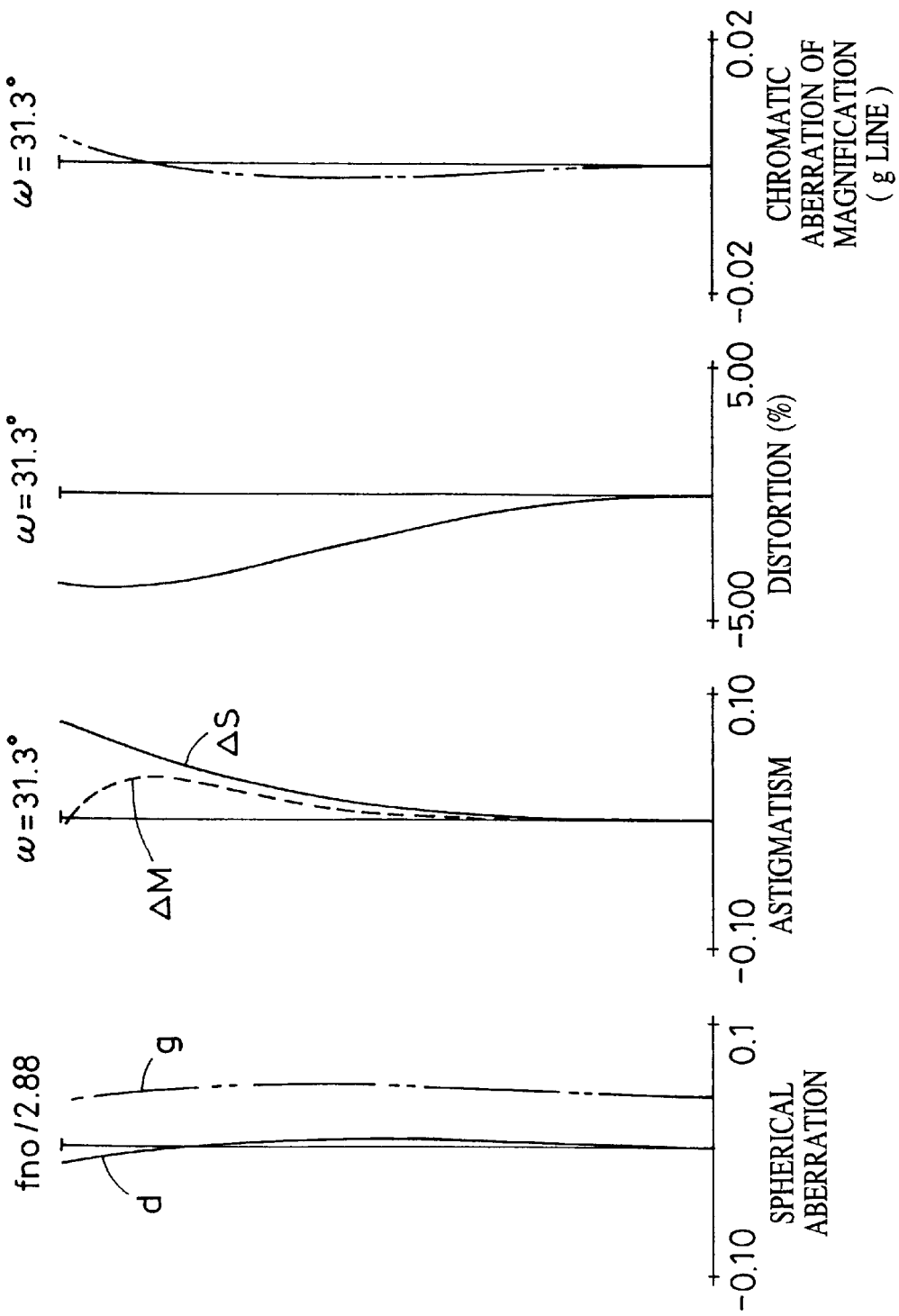
FIGS. 11A to 11D show aberrations at the wide angle end of the zoom lens of the third numerical example in accordance with the present invention.
Figure 12:
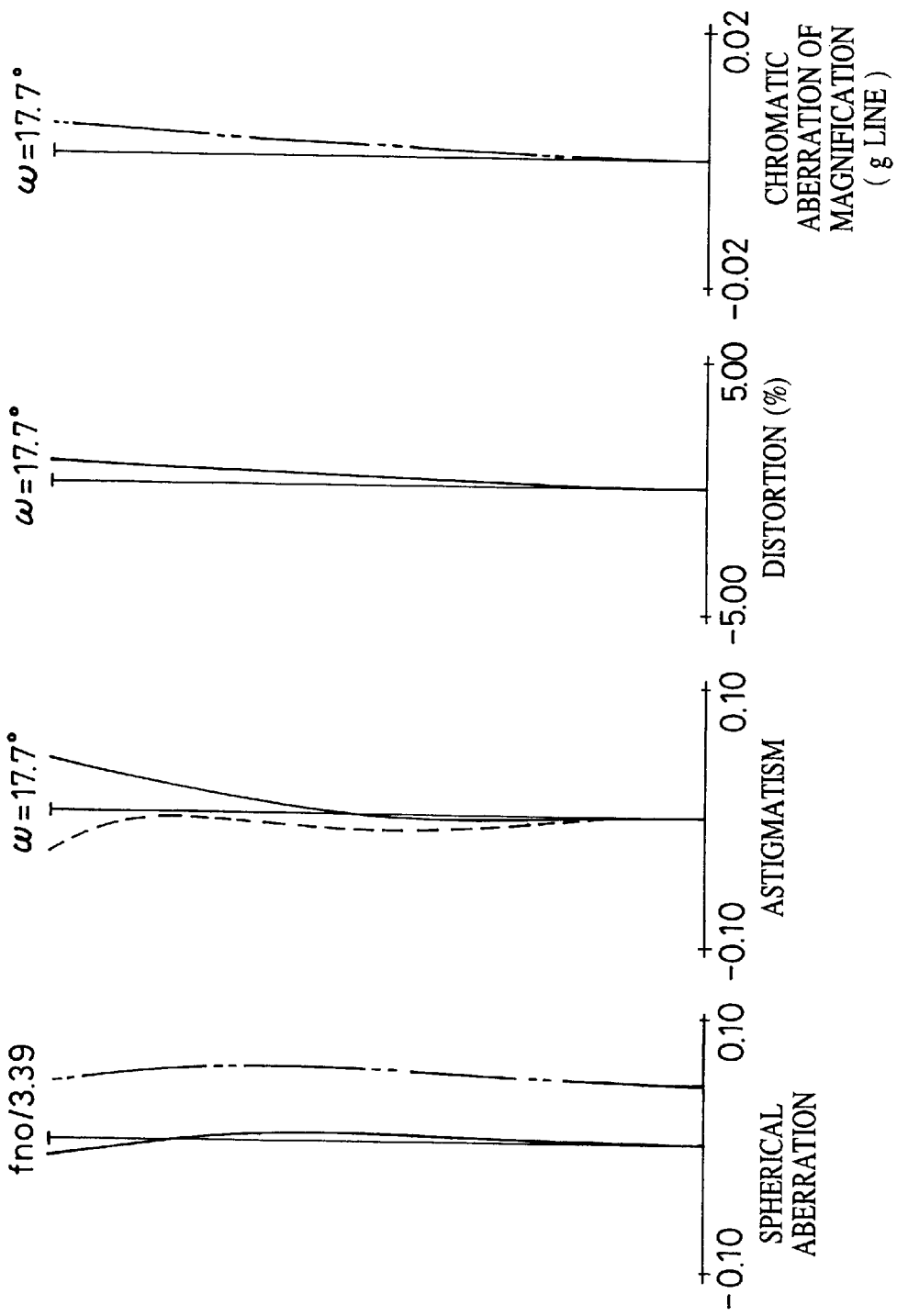
FIGS. 12A to 12D show the aberrations at an intermediate location of the zoom lens of the third numerical example in accordance with the present invention.
Figure 13:
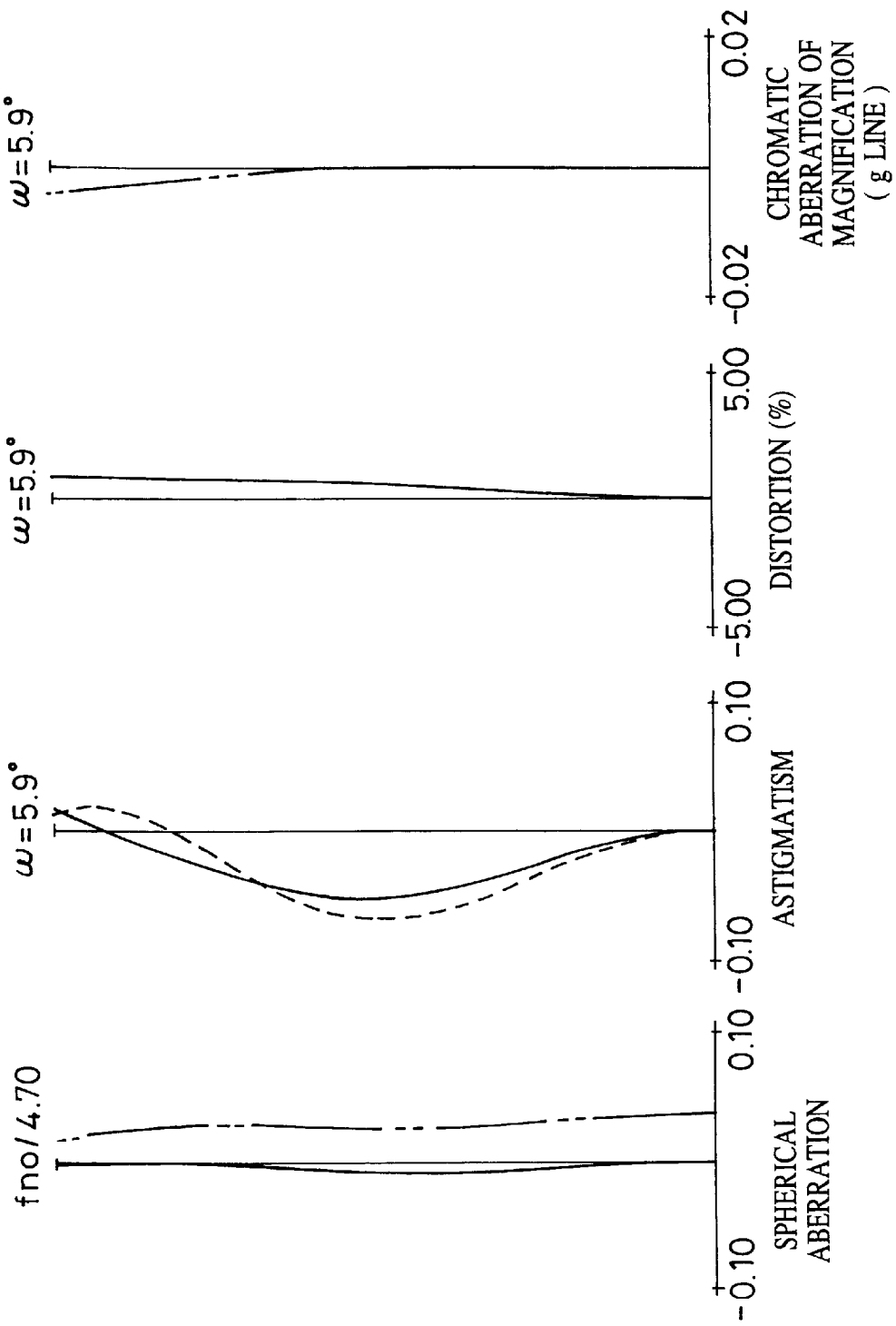
FIGS. 13A to 13D show the aberrations at a telephoto end of the zoom lens of the third numerical example in accordance with the present invention.

FIG. 10 is a sectional view of lenses at a wide angle end of a zoom lens of a third numerical example (described later) of the embodiment of the present invention. FIGS. 11A to 11D, FIGS. 12A to 12D, and FIGS. 13A to 13D show aberrations at the wide angle end, at an intermediate location, and at a telephoto end, respectively, of the zoom lens of the third numerical example.

Figure 14:
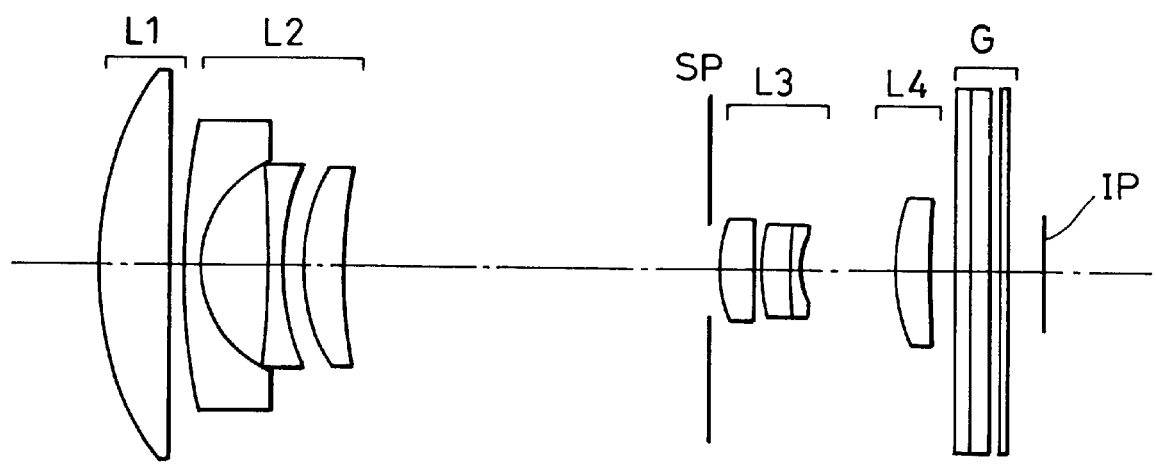
FIG. 14 is a sectional view of the lenses at a wide angle end of a zoom lens of a fourth numerical example in accordance with the present invention.
Figure 15:
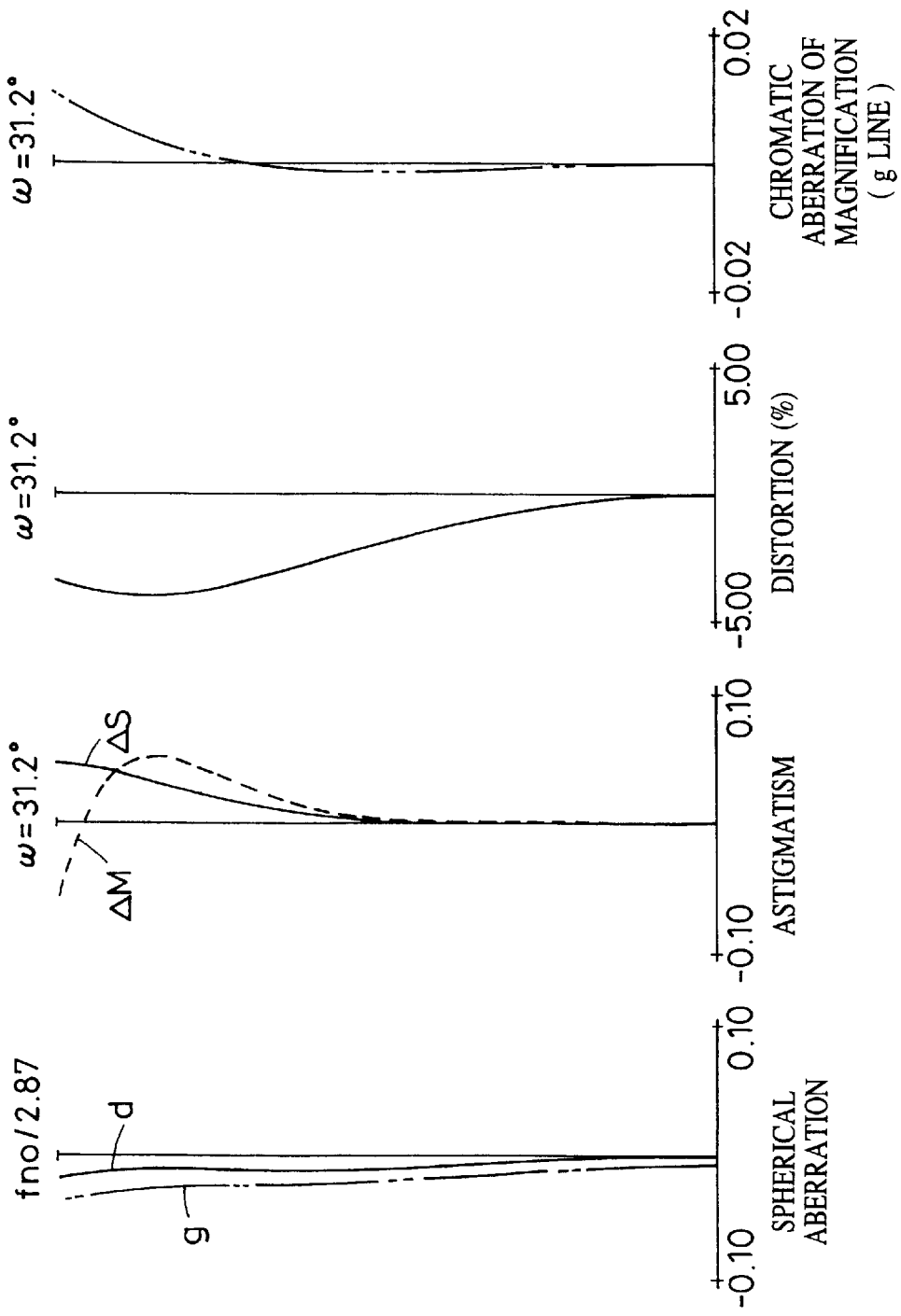
FIGS. 15A to 15D show aberrations at the wide angle end of the zoom lens in the fourth numerical example in accordance with the present invention.
Figure 16:
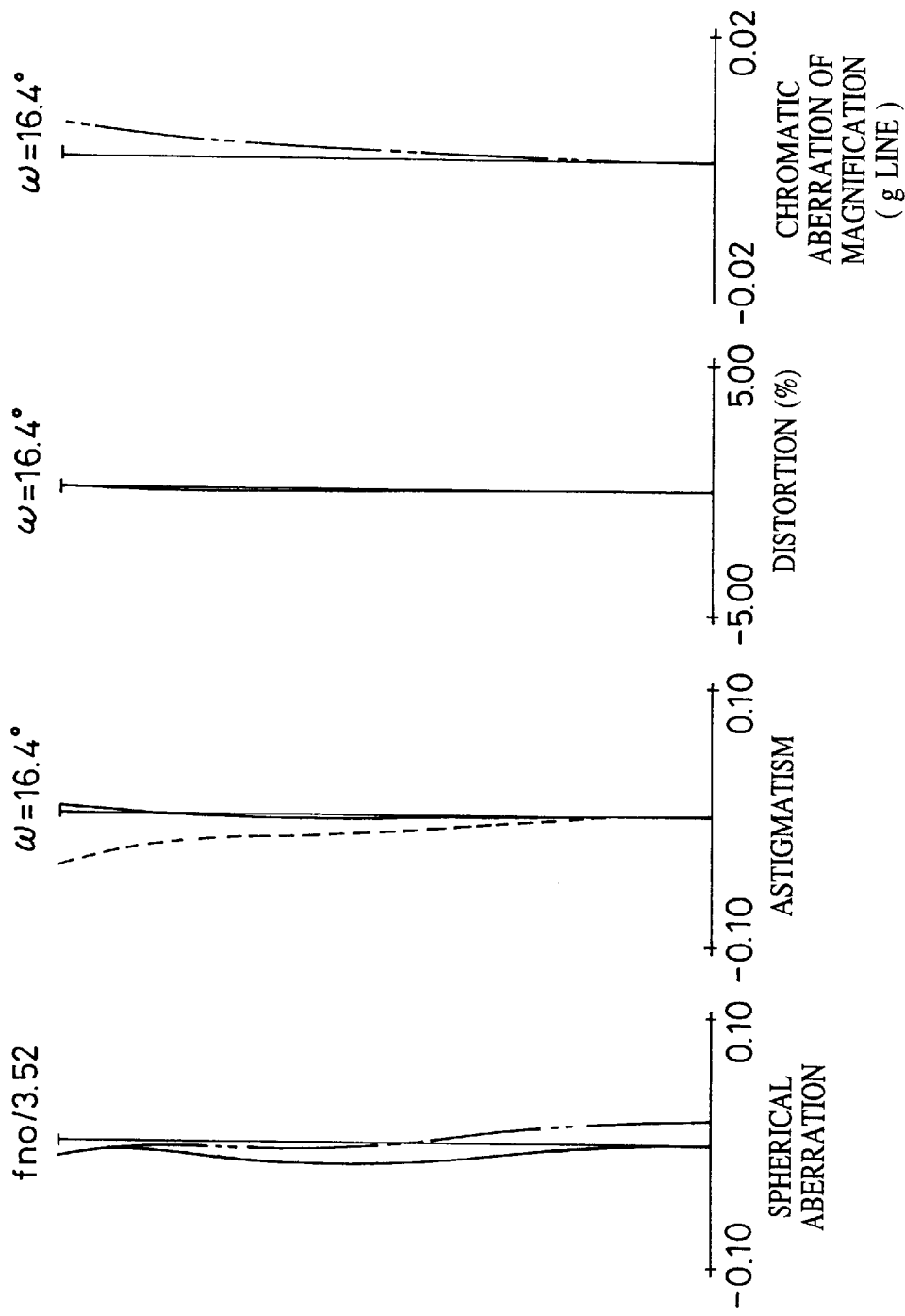
FIGS. 16A to 16D show the aberrations at an intermediate location of the zoom lens of the fourth numerical example in accordance with the present invention.
Figure 17:
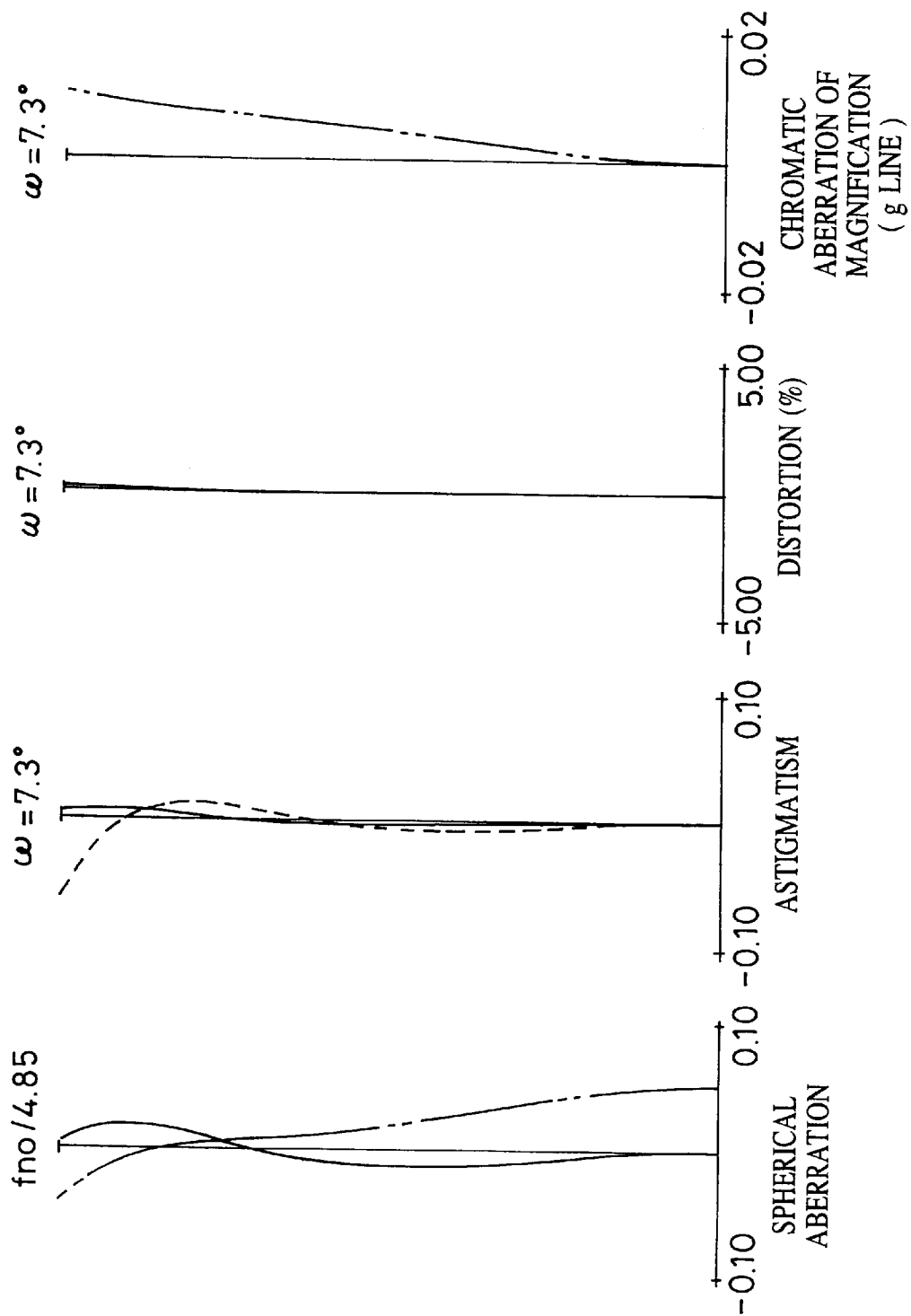
FIGS. 17A to 17D show the aberrations at a telephoto end of the zoom lens of the fourth numerical example in accordance with the present invention.

FIG. 14 is a sectional view of lenses at a wide angle end of a zoom lens of a fourth numerical example (described later) of the embodiment of the present invention. FIGS. 15A to 15D, FIGS. 16A to 16D, and FIGS. 17A to 17d show aberrations at the wide angle end, at an intermediate location, and at a telephoto end, respectively, of the zoom lens of the fourth numerical example.

Figure 18:
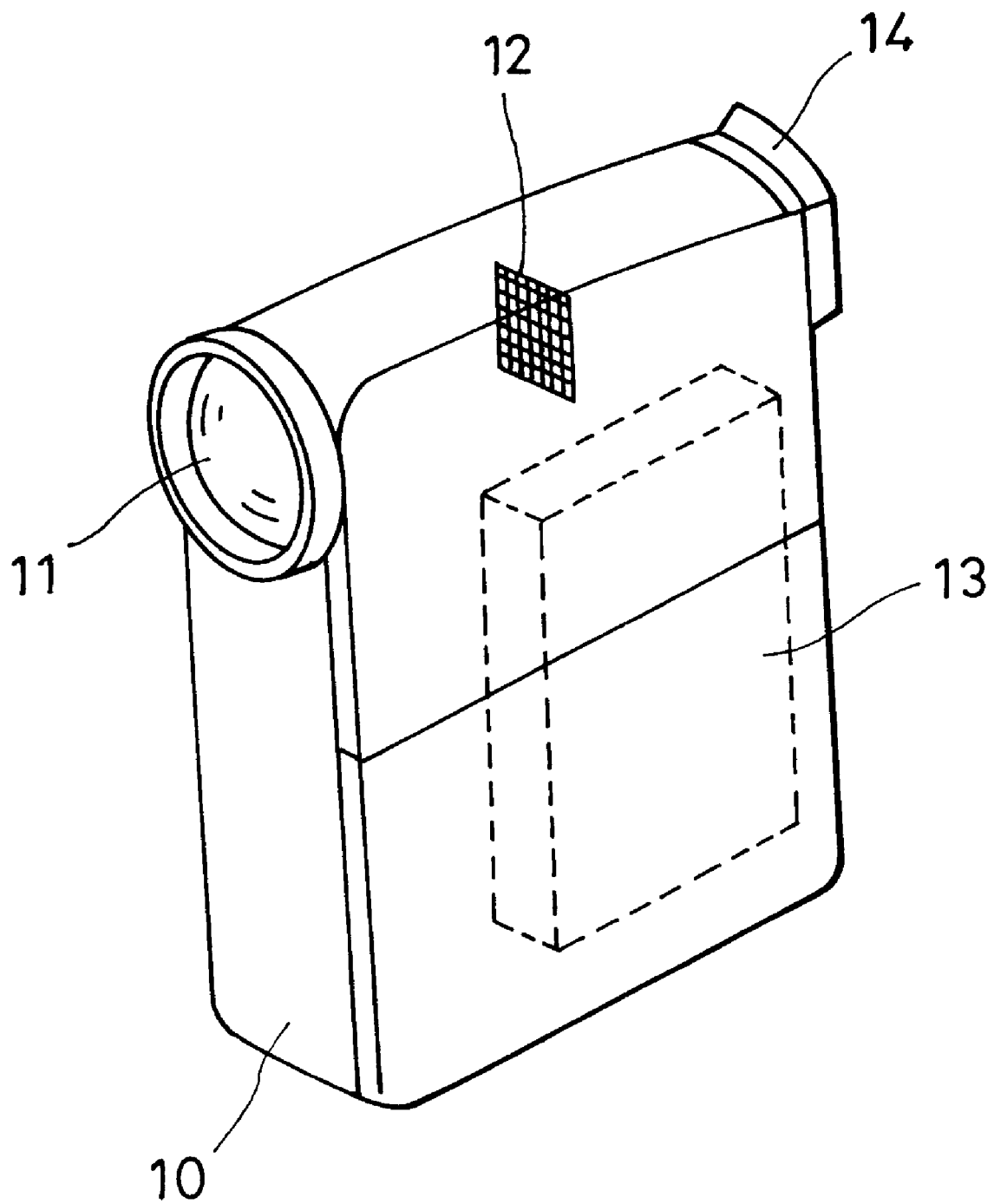
FIG. 18 is a schematic view of the main portion of an embodiment of an optical apparatus in accordance with the present invention.

FIG. 18 is a schematic view of the main portion of an optical apparatus using the zoom lens of the embodiment of the present invention.

In FIG. 1 and FIGS. 2, 6, 10, and 14 (which are sectional views of the lenses of the zoom lenses of the numerical examples), L1 denotes a first lens unit having a positive refractive power (optical power=reciprocal of the focal length), L2 denotes a second lens unit having a negative refractive power, L3 denotes a third lens unit having a positive refractive power, and L4 denotes a fourth lens unit having a positive refractive power.

SP denotes a stop which is disposed in front of the third lens unit L3, and which moves integrally with the third lens unit L3 when magnification is being changed.

IP denotes an image plane where, for example, a silver film and an image pickup device, such as a CCD (charge-coupled device) or a CMOS, are disposed.

G denotes a glass block, which corresponds to a phase plate or an optical filter.

In the zoom lens of the embodiment, when zooming is performed from the wide angle end to the telephoto end, as indicated by the arrows shown in FIG. 1, the first lens unit L1 and the third lens unit L3 are moved in the same way towards an object side, the fourth lens unit L4 is moved so as to describe a convex path towards the object side, and the second lens unit L2 is moved so as to describe a convex path towards an image plane side. As a result, at the telephoto end, the first lens unit L1 and the third lens unit L3 are disposed closer to the object side than to the wide angle end. On the other hand, at the telephoto end, the second lens unit L2 is disposed closer to an image side than to the wide angle end.

A rear focusing system that performs focusing by moving the fourth lens unit L4 on the optical axis is used. As shown by arrow 4c, the fourth lens unit L4 is moved forward towards the object side in order to change the focusing object distance from infinite distance to a close distance at the telephoto end. Solid curved line 4a and dotted curved line 4b for the fourth lens unit L4 represent the paths of movement for correcting changes in the image plane IP caused by changes in magnification from the wide angle end to the telephoto end when an object at infinity and a nearby object are in focus, respectively.

In the embodiment, by moving the third lens unit L3 towards the object side when performing zooming, the third lens unit L3 is caused to provide the main magnification change effect. Further, by moving the first lens unit L1 having a positive refractive power towards the object side, the second lens unit L2 is also caused to provide a magnification change effect, so that a magnification change ratio of the order of 5 can be easily obtained without making the refractive powers of the first lens unit L1 and the second lens unit L2 very large.

In the embodiment, by providing a diffraction optical surface having a rotationally symmetrical grating structure with respect to an optical axis of one or more of the four lens units, and by properly setting the phase thereof, chromatic aberration that occurs at one or more of the lens units including a diffraction optical surface is reduced, whereby chromatic aberration is properly corrected over the entire magnification change range.

In the embodiment, the first lens unit L1 having a large diameter is formed so as to consist of a single lens in order to make it light, thereby reducing the load of an actuator used to move the first lens unit L1. The third lens unit L3 is formed so as to include, from the object side, two positive lenses and, at the image plane side, a negative lens having a highly concave surface. By making the principal point distance resulting from the combination of the second lens unit L2 and the third lens unit L3 small, the lengths of the lenses following those of the third lens unit L3 are made small.

In order to correct changes in spherical aberration and other aberrations caused by focusing, the fourth lens unit L4 is formed so that it includes an aspherical surface. In the first and second numerical examples, by forming the second lens unit L2 so that it includes a diffraction optical surface, chromatic aberration that occurs at the second lens unit L2 is reduced although it has a two-lens structure. Therefore, chromatic aberration is properly corrected over the entire magnification change range.

In the third numerical example, by forming the first lens unit L1 so that it includes a diffraction optical surface, an even higher magnification change ratio of the order of 6 is achieved even though the first lens unit L1 consists of a single lens.

It is advisable to form the diffraction optical surface of the first lens unit so that it has positive refractive power in order for the diffraction optical surface to possess a chromatic aberration correction effect.

Forming the base of the diffraction optical surface of the first lens unit L1 into an aspherical surface is effective in correcting distortion at the wide angle end and spherical aberration and astigmatism at the telephoto end.

In the fourth numerical example, by forming the third lens unit L3 so that it includes a diffraction optical surface, chromatic aberration is reduced while the refractive power of the third lens unit L3 is increased, thereby reducing the size of the lens system.

By virtue of the above-described structure, there is realized a zoom lens which is suitable for use in video cameras, electronic still cameras, and cameras for silver-salt photography, which has a high magnification change ratio of the order equal to or greater than 5, an f-number of the order equal to or greater than 2.8, and a large aperture, and which is reduced in size while good optical performance is maintained.

The diffraction optical surface in the embodiment may be fabricated by a lithography technique used to produce a holographic optical element (HOE) or by binary optics used to produce an optical element by a binary technique. In these cases, in order to increase diffraction efficiency, it is desirable to form the diffraction optical surface into a saw-tooth-shaped surface. The diffraction optical surface may also be fabricated by molding using a die produced by either one of these methods.

Phase distribution φ(h) of the diffraction optical surface, which is described in the embodiment, is determined by the following formula:

$$\phi(h) = 2\pi/\lambda (C_2 \cdot h^2 + C_4 \cdot h^4 + \ldots C_{2i} \cdot h^{2i}) \quad (5)$$

where λ is the reference wavelength (d line), h is the distance from the optical axis, and C2i is the phase coefficient of the (2i) order term.

When the diffraction optical surface is formed so as to have one layer, sufficient diffraction efficiency can be obtained at wavelengths near a particular wavelength. Accordingly, in order to improve diffraction efficiency when what is called secondary spectrum becomes large with respect to wavelengths other that those near a particular wavelength, it is advisable to form the diffraction optical element into one having a layered structure that is formed by combining at least two diffraction gratings, as disclosed in Japanese Patent Laid-Open No. 10-133149. By forming the diffraction optical element into one having a layered structure including diffraction gratings, a high design-order diffraction efficiency equal to or greater than 95% over the entire wavelength range used is obtained.

The diffraction optical element having a layered structure may be formed of UV curable resin, plastic, or the like. Depending on the base material, it may be formed on a first direct base material. The thicknesses of the diffraction gratings do not have to be different. By combining materials, the thicknesses of the diffraction gratings can be made equal to each other.

In order for the zoom lens of the embodiment to have high optical performance in the entire magnification change range by further restricting changes in aberrations, caused by changes in magnification, at least one of the following conditions only need to be satisfied.

(Condition A)

When transverse magnifications at the wide angle end and the telephoto end of the third lens unit L3 with respect to an object at infinity are β3w and β3t, respectively, and the focal lengths of the entire system at the wide angle end and the telephoto end are fw and ft, respectively, the following Condition (1) is satisfied:

$$0.4 < (\beta 3t \cdot fw)/(\beta 3w \cdot ft) < 0.9 \quad (1)$$

Condition (1) is primarily provided in order not to make the sensitivities of the first lens unit L1 and the second lens unit L2 very large with the size of the entire lens system being reduced.

When the (β3t·fw)/(β3w·ft) value becomes less than the lower limit in Condition (1), so that the contribution of the third lens unit L3 to changing magnification becomes small, it is necessary to increase the refractive powers of the first lens unit L1 and the second lens unit L2 in order to maintain the magnification change ratio of the entire system. Therefore, the sensitivities become large, thereby increasing the effects of manufacturing errors. On the other hand, when the (β3t·fw)/(β3w·ft) value exceeds the upper limit in Condition (1), the amount of movement of the third lens unit L3 resulting from changes in magnification becomes large. This is not good because the overall length at the wide angle end becomes large.

(Condition B)

When the amount of movement of the first lens unit L1 and the amount of movement of the third lens unit L3, which are required for changing magnification from the wide angle end to the telephoto end, are m1 and m3, respectively, the following Condition (2) is satisfied:

$$0.35 < m1/m3 < 0.9 \quad (2)$$

When the m1/m3 value becomes less than the lower limit in Condition (2), so that the amount of movement of the first lens unit L1 becomes too small, the amount of movement of the third lens unit L3 required to change magnification becomes large, thereby causing the overall length at the wide angle end to become large. On the other hand, when the m1/m3 value exceeds the upper limit, so that the amount of movement of the first lens unit L1 becomes large, the overall length at the telephoto end becomes too large. This is not good because, when the lenses are to be constructed so as to be collapsibly mountable, an increase in the number of rows that need to be collapsibly mounted and other factors affect the lens-barrel structure.

(Condition C)

When the focal length of the second lens unit L2 is f2:

$$0.6 < |f2/\sqrt{fw \cdot ft}| < 1.2 \quad (3)$$

is satisfied.

In general, when the refractive power of the second lens unit L2 is not properly set, the amount of movement of the second lens unit L2 becomes too large, the performance thereof is decreased due to the effects of manufacturing errors caused by the sensitivity becoming too high, and jittering of an image becomes large when magnification changes are performed.

Condition (3) is provided to properly set the refractive power of the second lens unit L2, and to obtain a predetermined magnification change ratio with changes in aberrations caused by magnification changes being reduced.

When the $|f2/\sqrt{fw \cdot ft}|$ value becomes less than the lower limit in Condition (3), so that the refractive power of the second lens unit L2 becomes too small, the optical performance is deteriorated due to the effects of manufacturing errors, and jittering of an image becomes large when magnification changes are performed. On the other hand, when the $|f2/\sqrt{fw \cdot ft}|$ value exceeds the upper limit in Condition (3), the amount of movement of the second lens unit L2 becomes too large, so that the overall length cannot be reduced.

(Condition D)

When the second lens unit L2 comprises a negative lens and a positive lens, and when the radius of curvature of an object-side lens surface and the radius of curvature of an image-side lens surface of the negative lens in the second lens unit L2 (when aspherical surfaces are used, these are reference spherical surfaces determined by axial and effective diameters) are Ra and Rb, respectively, the following Condition (4) is satisfied:

$$-1.5 < (Rb+Ra)/(Rb-Ra) < 0.7 \quad (4)$$

When the (Rb+Ra)/(Rb−Ra) value becomes less than the lower limit in Condition (4), distortion that occurs at the wide angle end becomes too negative. On the other hand, when the (Rb+Ra)/(Rb−Ra) value exceeds the upper limit, distortion at the telephoto end cannot be completely corrected.

(Condition E)

When the second lens unit L2 comprises a diffraction optical surface, and when the second-order-term coefficient and the fourth-order-term coefficient of the diffraction optical surface of the second lens unit L2 are C22 and C24, respectively, and one-half of the effective diameter of the diffraction optical surface is H, the following Condition (5) is satisfied:

$$5.0 \times 10^{-3} < |C22 \cdot H^2 + C24 \cdot H^4| < 5.0 \times 10^{-2} \quad (5)$$

When the $|C22 \cdot H^2 + C24 \cdot H^4|$ value becomes less than the lower limit in Condition (5), chromatic aberration at the second lens unit L2 is not sufficiently corrected, so that chromatic aberration of magnification at the wide angle end is not sufficiently corrected. On the other hand, when the $|C22 \cdot H^2 + C24 \cdot H^4|$ value exceeds the upper limit in Condition (5), chromatic aberration is corrected excessively.

(Condition F)

Focusing of an object at finite distance is performed using the fourth lens unit L4.

(Condition G)

The first lens unit L1 includes a diffraction optical surface.

(Condition H)

The third lens unit L3 includes a diffraction optical surface.

(Condition I)

The diffraction optical surface has a layered structure including two or more layers.

(Condition J)

The second lens unit L2 comprises two lenses, that is, a negative lens and a positive meniscus lens, and at least one surface is formed into a diffraction optical surface, with its phase properly set.

According to this structure, chromatic aberration that occurs at the second lens unit L2 is reduced, and chromatic aberration is easily properly corrected over the entire magnification change range.

When an attempt is made to correct chromatic aberration by forming only a refractive surface without the use of a diffraction optical surface, the refractive powers of the positive and negative lenses become large due to achromatization, so that it is difficult to construct the second lens unit L2 with a small number of lenses, such as a single positive lens and a single negative lens, while the refractive powers are maintained.

In order to cause the diffraction optical surface to take over part of the achromatization by the second lens unit L2, it is desirable that the optical power of the diffraction optical surface be negative. When the optical power of the diffraction optical surface is positive, the direction in which chromatic aberration occurs (see symbol) is the same as that of an ordinary refractive optical system, so that an achromatizing effect is not produced at the diffraction optical surface, thereby preventing sufficient correction of chromatic aberration over the entire optical system.

(Condition K)

It is preferable that the second lens unit L2 include an aspherical surface which is shaped so that the negative optical power thereof becomes weaker towards a peripheral portion of the surface.

By virtue of this structure, it is possible to effectively correct curvature of field and distortion that occur at the wide angle end due to a reduction in the number of lenses used. In the first and second numerical examples, the base of the diffraction optical surface is formed into an aspherical surface.

(Condition L)

It is preferable that the second lens unit comprise two lenses, which are, in order of lens units from the object side, a negative lens and a positive lens.

According to this structure, the location of an entrance pupil at the wide angle end can be brought towards a first surface, thereby making it possible to reduce the diameter of the first lens unit L1.

In order to properly correct astigmatism and distortion at the wide angle end, it is preferable to form the second lens unit L2 so as to include, in order of lens units from the object side, a negative lens and a positive lens, the negative lens including an image-side surface having a higher optical power than the object-side surface and the positive lens including an object-side surface, which is a convex surface, having a higher optical power than the image-side surface.

An embodiment of a video camera (optical apparatus) using any one of the zoom lenses of the first to fourth numerical examples as a photographic optical system will be described with reference to FIG. 18.

In FIG. 18, reference numeral 10 denotes the body of the video camera, reference numeral 11 denotes a photographic optical system comprising any one of the zoom lenses of the first to fourth numerical examples, reference numeral 12 denotes an image pickup device, such as a charge-coupled device (CCD) or a CMOS, that receives a subject image, reference numeral 13 denotes recording means that records the subject image that has been received by the image pickup device 12, and reference numeral 14 denotes a finder for observing the subject image displayed on a display device. The display device comprises, for example, a liquid crystal panel, and displays the subject image formed on the image-pickup device 12.

In this way, by applying the zoom lens of the present invention to an optical apparatus, such as a video camera, a small optical apparatus having high optical performance is realized.

The data of the first to fourth numerical examples will be given. In the numerical examples, ri is the radius of curvature of an ith surface in order of surfaces from the object side, di is the thickness of an ith optical member in order of optical members from the object side or an air gap, and ni and vi denote, respectively, the refractive index and the Abbe constant of an ith optical member in order of optical members from the object side. The relationship between each of the aforementioned conditions and each of the numerical examples is given in Table 1.

In each of the numerical examples, a certain number of surfaces at the image side that do not possess refractive powers are parallel plates that correspond to optical filters or phase plates.

When the X-axis extends in the direction of the optical axis, the H-axis extends in a direction perpendicular to the optical axis, the direction of propagation of light is positive, R represents the paraxial radius of curvature, and k, B, C, and D each represent aspherical coefficients, the aspherical shape is defined by the following Formula (4):

$$X = \frac{(1/R)H^2}{1 + \sqrt{1 - (1+k)(H/R)^2}} + BH^4 + CH^6 + DH^8$$

D-ox represents $\times 10^{-x}$.

NUMERICAL EXAMPLE 1 f = 7.41600 to 34.91  fno = 1:2.88 to 4.50  2ω = 62.4° to 14.6°

| | | | | |
|---|---|---|---|---|
| r1 = 30.949 | | d1 = 3.40 | n1 = 1.51633 | ν1 = 64.1 |
| r2 = 502.326 | | d2 = varies | | |
| r3 = −294.249 | | d3 = 1.60 | n2 = 1.83481 | ν2 = 42.7 |
| r4 = 7.938 | (Diffraction Surface) | d4 = 3.50 | | |
| r5 = 14.940 | | d5 = 2.80 | n3 = 1.84666 | ν3 = 23.9 |
| r6 = 36.073 | | d6 = varies | | |
| r7 = ∞ | (Stop) | d7 = 0.80 | | |
| r8 = 9.254 | (Aspherical Surface) | d8 = 2.80 | n4 = 1.74330 | ν4 = 49.3 |
| r9 = −410.537 | | d9 = 0.30 | | |
| r10 = 10.725 | | d10 = 2.40 | n5 = 1.69680 | ν5 = 55.5 |
| r11 = 53.748 | | d11 = 0.70 | n6 = 1.84666 | ν6 = 23.9 |
| r12 = 5.703 | | d12 = varies | | |
| r13 = 21.783 | (Aspherical Surface) | d13 = 2.80 | n7 = 1.73077 | ν7 = 40.5 |
| r14 = −10.686 | | d14 = 0.80 | n8 = 1.69350 | ν8 = 53.2 |
| r15 = −82.896 | | d15 = varies | | |
| r16 = ∞ | | d16 = 1.20 | n9 = 1.51880 | ν9 = 64.2 |
| r17 = ∞ | | d17 = 1.56 | n10 = 1.55232 | ν10 = 63.4 |
| r18 = ∞ | | d18 = 0.74 | | |
| r19 = ∞ | | d19 = 0.50 | n11 = 1.55671 | ν11 = 58.6 |
| r20 = ∞ | | | | |

Asphrical coefficient

| | | | | | |
|---|---|---|---|---|---|
| 4th surface bq | r | k | B | C | D |
| | 7.93840D+00 | −8.76454D−01 | 4.44576D−05 | 3.58964D−07 | −3.15350D−09 |
| 8th surface q | r | k | B | C | D |
| | 9.25378D+00 | −1.56955D+00 | 1.31473D−04 | −4.43182D−07 | 7.17181D−09 |
| 13th surface q | r | k | B | C | D |
| | 2.17826D+01 | −1.02716D+01 | 1.00018D−04 | −1.03504D−06 | 7.38711D−09 |

Diffraction surface phase coefficient

4th surface   $C_2 = -7.1207 \times 10^{-5}$   $C_4 = 7.7896 \times 10^{-6}$

| Focal Length Variation Interval | 7.42 | 14.19 | 34.91 |
|---|---|---|---|
| d 2 | 1.00 | 10.17 | 23.40 |
| d 6 | 30.50 | 14.57 | 3.36 |
| d 12 | 3.78 | 5.46 | 17.02 |
| d 15 | 3.00 | 5.07 | 6.02 |

NUMERICAL EXAMPLE 2 f = 7.41600 to 34.92  fno = 1:2.88 to 4.50  2ω = 62.4° to 14.6°

| | | | | |
|---|---|---|---|---|
| r1 = 31.186 | | d1 = 3.40 | n1 = 1.48749 | ν1 = 70.2 |
| r2 = −7563.631 | | d2 = varies | | |
| r3 = −255.855 | | d3 = 1.60 | n2 = 1.83481 | ν2 = 42.7 |
| r4 = 7.934 | (Diffraction Surface) | d4 = 3.50 | | |
| r5 = 14.828 | | d5 = 2.80 | n3 = 1.84666 | ν3 = 23.9 |
| r6 = 36.800 | | d6 = varies | | |
| r7 = ∞ | (Stop) | d7 = 0.80 | | |
| r8 = 9.250 | (Aspherical Surface) | d8 = 2.80 | n4 = 1.74330 | ν4 = 49.3 |
| r9 = −1125.876 | | d9 = 0.30 | | |
| r10 = 10.800 | | d10 = 2.40 | n5 = 1.69680 | ν5 = 55.5 |
| r11 = 48.834 | | d11 = 0.70 | n6 = 1.84666 | ν6 = 23.9 |
| r12 = 5.728 | | d12 = varies | | |
| r13 = 21.685 | (Aspherical Surface) | d13 = 2.80 | n7 = 1.80610 | ν7 = 40.7 |
| r14 = −14.864 | | d14 = 0.80 | n8 = 1.76318 | ν8 = 47.6 |
| r15 = −115.290 | | d15 = varies | | |
| r16 = ∞ | | d16 = 1.20 | n9 = 1.51680 | ν9 = 64.2 |
| r17 = ∞ | | d17 = 1.55 | n10 = 1.55232 | ν10 = 63.4 |
| r18 = ∞ | | d18 = 0.74 | | |
| r19 = ∞ | | d19 = 0.50 | n11 = 1.55671 | ν11 = 58.6 |

-continued r20 = ∞

Asphrical coefficient

| 4th surface bq | r | k | B | C | D |
|---|---|---|---|---|---|
| | 7.93394D+00 | −8.04557D−01 | 3.55023D−05 | 2.43543D−07 | −2.70770D−09 |
| 8th surface q | r | k | B | C | D |
| | 9.24963D+00 | −1.62220D+00 | 1.40859D−04 | −2.26911D−07 | −3.88586D−09 |
| 13th surface q | r | k | B | C | D |
| | 2.16850D+01 | −1.25903D+01 | 1.38794D−04 | −1.71623D−06 | 1.54845D−08 |

Diffraction surface phase coefficient

4th surface  $C_2 = 9.06075 \times 10^{-5}$   $C_4 = 3.0 \times 10^{-6}$

| Focal Length Variation Interval | 7.42 | 14.19 | 34.92 |
|---|---|---|---|
| d 2 | 1.00 | 10.10 | 23.30 |
| d 6 | 30.73 | 14.55 | 3.36 |
| d 12 | 4.12 | 6.01 | 18.66 |
| d 15 | 3.00 | 5.07 | 6.02 |

NUMERICAL EXAMPLE 3 f = 7.40000 to 43.30   fno = 1:2.88 to 4.70   $2\omega = 62.6°$ to $11.8°$

| r1 = 30.542 | | d1 = 5.40 | n1 = 1.51633 | ν1 = 64.1 |
|---|---|---|---|---|
| r2 = 5651.519 | (Diffraction Surface) | d2 = varies | | |
| r3 = 44.885 | | d3 = 1.60 | n2 = 1.77250 | ν2 = 49.6 |
| r4 = 10.097 | | d4 = 5.60 | | |
| r5 = −78.725 | | d5 = 1.20 | n3 = 1.69680 | ν3 = 55.5 |
| r6 = 19.408 | | d6 = 1.60 | | |
| r7 = 18.687 | | d7 = 2.80 | n4 = 1.84666 | ν4 = 23.9 |
| r8 = 58.680 | | d8 = varies | | |
| r9 = ∞ | (Stop) | d9 = 0.80 | | |
| r10 = 9.961 | (Aspherical Surface) | d10 = 2.80 | n5 = 1.74330 | ν5 = 49.3 |
| r11 = −232.547 | | d11 = 0.30 | | |
| r12 = 10.304 | | d12 = 2.40 | n6 = 1.69680 | ν6 = 55.5 |
| r13 = 69.299 | | d13 = 0.70 | n7 = 1.84666 | ν7 = 23.9 |
| r14 = 5.929 | | d14 = varies | | |
| r15 = 16.147 | (Aspherical Surface) | d15 = 3.50 | n8 = 1.73077 | ν8 = 40.5 |
| r16 = −8.875 | | d16 = 0.80 | n9 = 1.69350 | ν9 = 53.2 |
| r17 = 46.161 | | d17 = varies | | |
| r18 = ∞ | | d18 = 1.20 | n10 = 1.51680 | ν10 = 64.2 |
| r19 = ∞ | | d19 = varies | n11 = 1.55232 | ν11 = 63.4 |
| r20 = ∞ | | d20 = 0.74 | | |
| r21 = ∞ | | d21 = 0.50 | n12 = 1.55671 | ν12 = 58.6 |
| r22 = ∞ | | | | |

Asphrical coefficient

| 2nd surface bq | r | k | B | C | D |
|---|---|---|---|---|---|
| | 5.65152D+03 | −1.00000D+07 | 1.72966D−06 | 4.36817D−10 | −5.02672D−12 |
| 10th surface q | r | k | B | C | D |
| | 9.96130D+00 | −7.11742D−01 | −4.60932D−06 | 1.60362D−07 | −3.98795D−09 |
| 15th surface q | r | k | B | C | D |
| | 1.61455D+01 | −4.92621D+00 | 1.06769D−04 | −3.94747D−07 | −6.01610D−09 |

Diffraction surface phase coefficient

2nd surface  $C_2 = -1.1367 \times 10^{-4}$   $C_4 = -4.0274 \times 10^{-8}$

| Focal Length Varitaion Interval | 7.40 | 14.78 | 43.30 |
|---|---|---|---|
| d 2 | 1.00 | 10.17 | 22.70 |
| d 8 | 32.32 | 16.45 | 3.01 |
| d 14 | 4.91 | 6.89 | 20.00 |
| d 17 | 3.00 | 5.07 | 6.02 |

NUMERICAL EXAMPLE 4

| f = 7.41600 to 34.94 | fno = 1:2.87 to 4.85 | 2ω = 62.4° to 14.6° | | |
|---|---|---|---|---|
| r1 = 27.447 | | d1 = 5.50 | n1 = 1.51633 | ν1 = 64.1 |
| r2 = −1482.627 | | d2 = varies | | |
| r3 = 50.828 | | d3 = 1.40 | n2 = 1.77260 | ν2 = 49.6 |
| r4 = 9.054 | | d4 = 5.00 | | |
| r5 = −114.524 | | d5 = 1.20 | n3 = 1.69680 | ν3 = 55.5 |
| r6 = 22.524 | | d6 = 1.50 | | |
| r7 = 16.555 | | d7 = 2.80 | n4 = 1.84666 | ν4 = 23.9 |
| r8 = 35.199 | | d8 = varies | | |
| r9 = ∞ | (Stop) | d9 = 0.80 | | |
| r10 = 10.259 | (Diffraction Surface) | d10 = 2.80 | n5 = 1.74330 | ν5 = 49.3 |
| r11 = −64.429 | | d11 = 0.30 | | |
| r12 = 11.515 | | d12 = 2.40 | n6 = 1.69680 | ν6 = 55.5 |
| r13 = 25.789 | | d13 = 0.70 | n7 = 1.84666 | ν7 = 23.9 |
| r14 = 6.209 | | d14 = varies | | |
| r15 = 14.698 | (Aspherical Surface) | d15 = 2.50 | n8 = 1.73077 | ν8 = 40.5 |
| r16 = 61.509 | | d16 = varies | | |
| r17 = ∞ | | d17 = 1.20 | n9 = 1.61680 | ν9 = 64.2 |
| r18 = ∞ | | d18 = 1.68 | n10 = 1.55232 | ν10 = 63.4 |
| r19 = ∞ | | d19 = 0.74 | | |
| r20 = ∞ | | d20 = 0.60 | n11 = 1.55671 | ν11 = 58.6 |
| r21 = ∞ | | | | |

Aspherical surface

| 10th surface | r | k | B | C | D |
|---|---|---|---|---|---|
| | 1.02587D+01 | −5.35536D−01 | −5.70977D−05 | −7.13905D−07 | 1.58086D−08 |
| 15th surface | r | k | B | C | D |
| | 1.46979D+01 | −7.15620D−01 | 2.09196D−05 | −2.34697D−07 | 5.86021D−09 |

Diffraction surface phase coefficient $C_2 = -2.5745 \times 10^{-4}$    $C_4 = -2.2025 \times 10^{-6}$

| Focal Length Variation Interval | 7.42 | 16.28 | 34.94 |
|---|---|---|---|
| d 2 | 1.00 | 7.02 | 14.46 |
| d 8 | 27.94 | 12.29 | 3.29 |
| d 14 | 7.26 | 11.49 | 24.80 |
| d 16 | 2.00 | 4.07 | 5.02 |

TABLE 1

| CONDITIONAL EXPRESSION | NUMERICAL EXAMPLE 1 | NUMERICAL EXAMPLE 2 | NUMERICAL EXAMPLE 3 | NUMERICAL EXAMPLE 4 |
|---|---|---|---|---|
| (1) $(\beta 3t \cdot fw)/(\beta 3w \cdot ft)$ | 0.680 | 0.700 | 0.538 | 0.737 |
| (2) m1/m3 | 0.709 | 0.711 | 0.580 | 0.456 |
| (3) $|f2/\sqrt{fw \cdot ft}|$ | 0.981 | 0.989 | 0.779 | 0.785 |
| (4) (Rb + Ra)/(Rb − Ra) | −0.947 | −0.936 | — | — |
| (5) $|C_{22} \cdot H^2 + C_{24} \cdot H^4|$ | $2.571 \times 10^{-2}$ | $1.692 \times 10^{-2}$ | — | — |

It is possible to realize a zoom lens which comprises a diffraction optical surface in a portion of an optical system in order to reduce chromatic aberration that occurs in each lens unit by combining diffractive optical action and achromatization effect of a diffractive system, which makes it possible to reduce the overall length by reducing the number of lenses used while the refractive power at a magnification change portion is maintained, and which possesses good optical performance over the entire magnification change range from a wide angle and to a telephoto end. An optical apparatus using the zoom lens can also be realized.

It is possible to obtain a zoom lens that has reduced overall length while excellent optical performance is maintained by forming a diffraction optical surface that is rotationally symmetrical to at least one optical axis in this zoom lens which comprises four lens units, which are a lens unit having a positive refractive power, a lens unit having a negative refractive power, a lens unit having a positive refractive power, and a lens unit having a positive refractive power. In the zoom lens, magnification changes are performed by moving the first and third lens units towards the object side, and the first lens unit consists of a single lens.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A zoom lens comprising in order from object side to image side:
    a first lens unit having a positive optical power, the first lens unit consisting of a positive lens element;
    a second lens unit having a negative optical power;
    a third lens unit having a positive optical power; and
    a fourth lens unit having a positive optical power,
    wherein, when zooming is carried out from a wide angle end to a telephoto end, the first lens unit and the third lens unit are moved so that, at the telephoto end, the first lens unit and the third lens unit are positioned closer to the object side than at the wide angle end, and the second lens unit is moved so that, at the telephoto end, the second lens unit is positioned closer to the image side than at the wide angle end, and
    wherein the zoom lens further comprises at least one diffraction optical surface.

2. A zoom lens according to claim 1, wherein the following condition is satisfied:

$$0.4 < (\beta 3t \cdot fw)/(\beta 3w \cdot ft) < 0.9$$

where $\beta 3w$ and $\beta 3t$ are transverse magnifications at the wide angle end and at the telephoto end of the third lens unit with respect to an object at infinity, respectively, and fw and ft are the focal lengths of the entire system at the wide angle end and at the telephoto end, respectively.

3. A zoom lens according to claim 1, wherein the following condition is satisfied:

$$0.35 < m1/m3 < 0.9$$

where m1 is the amount of movement of the first lens unit and m3 is the amount of movement of the third lens unit, when carrying out the zooming from the wide angle end to the telephoto end.

4. A zoom lens according to claim 1, wherein the following condition is satisfied:

$$0.6 < |f2/\sqrt{(fw \cdot ft)}| < 1.2$$

where f2 is the focal length of the second lens unit, and fw and ft are the focal lengths of the entire lens system at the wide angle end and at the telephoto end, respectively.

5. A zoom lens according to claim 1, wherein the second lens unit consists of a negative lens element and a positive lens element.

6. A zoom lens according to claim 5, wherein the following condition is satisfied:

$$-1.5 < (Rb+Ra)/(Rb-Ra) < 0.7$$

where Ra and Rb are the radius of curvature of an object-side surface and the radius of curvature of an image-side surface of the negative lens element of the second lens unit, respectively.

7. A zoom lens according to claim 1, wherein the second lens unit includes a diffraction optical surface.

8. A zoom lens according to claim 7, wherein the following condition is satisfied:

$$5.0 \times 10^{-3} < |C22 \cdot H^2 + C24 \cdot H^4| < 5.0 \times 10^{-2}$$

where C22 is the second-order-term coefficient of the diffraction optical surface of the second lens unit and C24 is the fourth-order-term coefficient of the diffraction optical surface of the second lens unit, and H is one-half of the effective diameter of the diffraction optical surface.

9. A zoom lens according to claim 1, wherein the first lens unit includes a diffraction optical surface.

10. A zoom lens according to claim 1, wherein the third lens unit includes a diffraction optical surface.

11. A zoom lens according to claim 1, wherein the diffraction optical surface has a layered structure of at least two layers.

12. A zoom lens according to claim 1, wherein, when focusing is performed, the fourth lens unit moves.

13. A zoom lens according to claim 1, wherein the zoom lens is an optical system for forming an image on an image pickup device.

14. An optical apparatus comprising the zoom lens of claim 1.

15. An optical apparatus according to claim 14 further comprising an image pickup device that is disposed at an image formation surface of the zoom lens.

* * * * *

UNITED STATES PATENT AND TRADEMARK OFFICE
CERTIFICATE OF CORRECTION

PATENT NO.    : 6,577,450 B2
DATED         : June 10, 2003
INVENTOR(S)   : Hiroyuki Hamano et al.

It is certified that error appears in the above-identified patent and that said Letters Patent is hereby corrected as shown below:

Column 5,
Line 11, "17d" should read -- 17D --.

Column 7,
Line 15, "that" should read -- than --.

Column 9,
Line 5, "$H^4$" should read -- $H^4|$ --.

Column 10,
Line 45, "vi" should read -- vi --.

Column 11,
Line 30, "Asphrical" should read -- Aspherical --.

Signed and Sealed this

Second Day of December, 2003

JAMES E. ROGAN
*Director of the United States Patent and Trademark Office*